Oct. 29, 1963  D. P. SELF  3,108,489
LEFT FOOT ACCELERATOR
Filed April 18, 1961
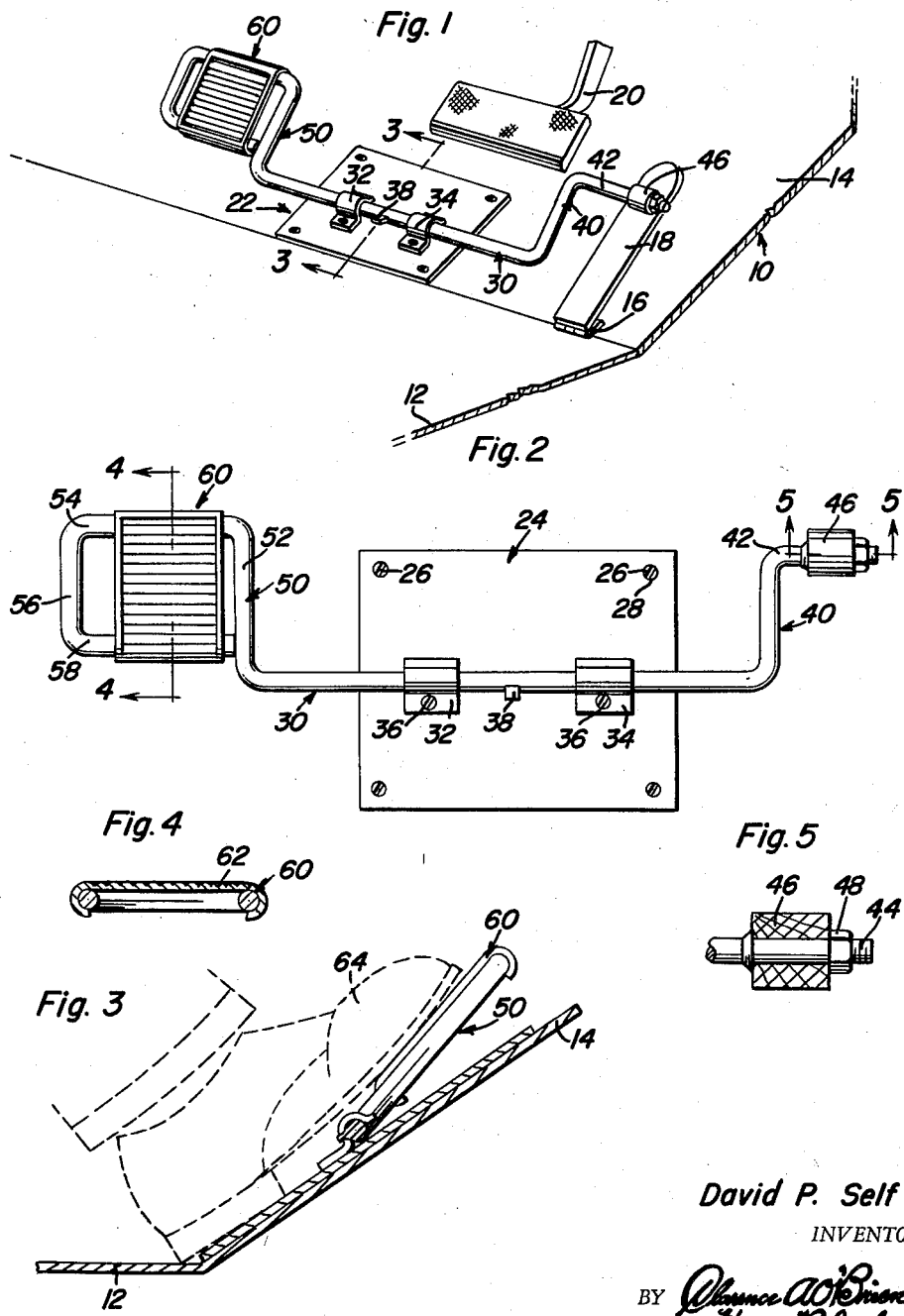
David P. Self
INVENTOR.
BY *Clarence A. O'Brien*
and *Harvey B. Jackson*
Attorneys

United States Patent Office 3,108,489
Patented Oct. 29, 1963

3,108,489
LEFT FOOT ACCELERATOR
David P. Self, West Columbia, Tex.
(Box 2319, Velasco Station, Freeport, Tex.)
Filed Apr. 18, 1961, Ser. No. 103,893
6 Claims. (Cl. 74—562.5)

This invention relates to a novel and useful left foot accelerator and more particularly to an attachment for motor vehicles specifically adapted to enable the driver of a motor vehicle to utilize his left foot for accelerating rather than using his right foot as is conventional.

Motor vehicles are customarily provided with accelerator pedals adapted to be engaged by the right foot of the vehicle driver. However, during extremely long trips across country the driver of a motor vehicle oftentimes becomes tired of holding his right foot in one position in order to maintain the vehicle he is driving at a constant speed.

In the past, special complicated systems have been devised for controlling the speed of a vehicle whereby the speed of the vehicle may be maintained constant merely by setting a control for the speed desired. This however removes a portion of the control the driver has over a vehicle and is for the most part not considered an advancement in safety precautions. The left foot accelerator of the instant invention is specifically adapted to enable the left foot of a vehicle driver to be used in maintaining the correct accelerator setting. The left foot accelerator may or may not be used as desired by the driver of a vehicle and the left foot accelerator does not interfere with the normal operation of the accelerator pedal of the vehicle by the right foot of the driver. Thus, the driver of a vehicle equipped with the left foot accelerator of the instant invention may alternately use both his feet in controlling the speed of the vehicle and use his right foot in the conventional manner.

The left foot accelerator of the instant invention includes a mounting base adapted to be secured to the floorboard of a motor vehicle a spaced distance to the left of the conventional right foot accelerator provided. The left foot accelerator includes a support shaft which extends transversely of the vehicle and is rotated about its longitudinal axis by means of a pair of journals carried by the mounting base which are spaced longitudinally of the shaft. The right end of the shaft includes an actuating arm which projects laterally from one side of the shaft and is adapted to be aligned with and disposed in contacting relation with the free end of the conventional accelerator pedal of the vehicle in which the left foot accelerator is secured. The other end of the shaft includes a laterally directed left foot pedal which may be readily engaged by the left foot of the driver of the vehicle. The shaft of the left foot accelerator is provided with stop means for limiting rotational movement of the shaft and the stop means is engageable with the mounting plate. In addition, the stop means is disposed between the spaced journals carried by the mounting plate and is engageable with the journals. In this manner, the shaft is rotatably supported by the journals and is also slidable longitudinally through the journals between limit positions established by the stop means carried by the shaft engaging confronting portions of the spaced journals.

The free end of the laterally directed actuating arm carried by the right end of the shaft is provided with a laterally directed stub shaft which generally parallels the longitudinal axis of the shaft extending through the journals of the mounting plate. A roller is journalled on the stub shaft and is aligned with the conventional right foot accelerator provided in the vehicle. Accordingly, it may be observed that the actuating arm carried by the shaft of the left foot accelerator does not overlie the conventional right foot accelerator of the vehicle in which the left foot accelerator is secured but that the laterally directed stub axle carried by the free end of the actuating arm and the roller journalled thereon are aligned with the conventional right foot accelerator.

The main object of this invention is to provide a left foot accelerator which may be utilized by the driver of a vehicle to maintain the desired accelerator setting by means of his left foot.

A further object of this invention, in accordance with the preceding object, is to provide a left foot accelerator which may be moved from between operative and inoperative positions engaged and disengaged with the conventional right foot accelerator of the vehicle.

Still another object of this invention is to provide a left foot accelerator which will, when disposed in the operative position engaged with the conventional right foot accelerator pedal of the vehicle in which the left foot accelerator is secured, enable continued operation of the right foot accelerator by the right foot of the driver of the vehicle.

A final object to be specifically enumerated herein is to provide a left foot accelerator which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the left foot accelerator shown mounted upon a portion of the floorboard of a vehicle, portions of the floorboard being broken away and shown in section;

FIGURE 2 is a top plan view of the left foot accelerator;

FIGURE 3 is an enlarged fragmentary vertical sectional view taken substantially upon the plane indicated by the section line 3—3 of FIGURE 1;

FIGURE 4 is a transverse vertical sectional view taken substantially upon the plane indicated by the section line 4—4 of FIGURE 2; and FIGURE 5 is a fragmentary vertical sectional view taken substantially upon the plane indicated by the section line 5—5 of FIGURE 2.

Referring now more specifically to the drawings the numeral 10 generally designates a vehicle including a horizontal floorboard portion 12 and a forwardly and upwardly inclined floorboard portion 14. Hingedly secured to the vehicle 10 at the intersection of the floorboard portions 12 and 14 by means of the hinge 16 is a conventional right foot accelerator pedal 18. The vehicle 10 also includes a brake pedal 20 and it will be noted that the left foot accelerator of the instant invention is generally referred to by the reference numeral 22. The left foot accelerator includes a mounting plate generally referred to by the reference numeral 24 which is suitably apertured as at 26 and is secured to the floorboard section 14 by means of suitable fasteners 28 secured through the apertures 26. A mounting shaft generally referred to by the reference numeral 30 is provided and a pair of spaced journals 32 and 34 are secured to the mounting base 24 by means of suitable fasteners 36 and rotatably journal the shaft 30 at points spaced longitudinally therealong. The shaft 30 includes an abutment stop 38 disposed between the journals 32 and 34 and the abutment stop 38 not only limits axial shifting of the shaft 30 relative to the journals 32 and 34 but also limits the rotation of the shaft 30 in a counterclockwise direction as viewed in FIGURE 3 of the drawings by engagement with the mounting plate 24.

One end of the shaft 30 includes a laterally directed actuating arm portion 40 whose free end is provided with a laterally directed stub shaft 42 whose free end is externally threaded as at 44. A roller 46 is journalled on the stub shaft 42 and is retained thereon by means of threaded fastener 48 engaged with the threaded end portion 44.

The other end of the shaft 30 has a laterally directed left foot pedal generally referred to by the reference numeral 50 carried thereby. The left foot pedal 50 extends from the same side of the shaft 30 as does the actuating arm portion 40 and it will be noted that the left foot pedal includes first, second, third and fourth consecutive laterally directed portions 52, 54, 56 and 58 respectively which are formed integrally with the shaft 30. Additionally, it will be noted that the actuating arm 40 and the stub shaft 42 are also formed integrally with the shaft 30. The left foot pedal 50 has a cover plate generally referred to by the reference numeral 60 frictionally secured thereto and the cover plate 60 is provided with a roughened upper surface 62.

In operation, the left foot accelerator may be positioned as illustrated in FIGURE 1 of the drawings with the roller 46 disposed in rolling contacting relation with the upper surface of the accelerator pedal 18. Then, the left foot 64 of the driver of the vehicle 10 may be engaged with the left foot pedal 50 as illustrated in FIGURE 3 of the drawings to depress the accelerator pedal 18 by depressing the left foot pedal 50 and rotating the shaft 30 in a clockwise direction as viewed in FIGURE 3 of the drawings.

If it is desired to move the left foot accelerator 22 to an inoperative position, as viewed in FIGURES 1 and 2, the shaft 30 may be axially displaced to the left in order that the roller 46 and stub shaft 42 may be moved out of registry with the accelerator pedal 18. Thus, in this manner, the left foot accelerator 22 may be rendered inoperative. If it is desired, after the shaft 30 has been axially displaced to the left as viewed in FIGURES 1 and 2 of the drawings and the actuating arm portion 40 and the left foot pedal 50 are engaged with the forward and upwardly inclined portion 14 of the floorboard, the shaft 30 may be axially displaced to the right in order to position the roller 46 beneath the accelerator pedal 18. In this manner, the roller 46 may be used as a governor to prevent the accelerator pedal 18 from being completely depressed.

It will be noted that the abutment stop 38 may also be used to move the accelerator 22 to and from the inoperative position. If it is desired to move the accelerator 22 from the inoperative position to the operative position the abutment stop 38 may be engaged by the foot of the operator of the vehicle 10 in order to urge the accelerator 22 to the left. Then the abutment stop 38 may be swung rearwardly until it engages the horizontal portion 12 of the floorboard and thereafter urged to the right to position the roller 46 in alignment with the upper surface of the accelerator pedal 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A left foot accelerator comprising a mounting base plate adapted to be secured to the floorboard of a motor vehicle adjacent the accelerator pedal of the latter, a support shaft adapted to extend transversely of said floorboard, means carried by said base plate journalling said support shaft for rotation about its longitudinal axis and with a portion of said support shaft intermediate its opposite ends extending across the upper surface of said plate, an actuating arm carried by one end portion of said shaft and projecting laterally to one side of the latter, said actuating arm having abutment means on its free end portion adapted for alignment with and to engage the upper surface of said accelerator pedal, a left foot pedal carried by the other end portion of said shaft and projecting laterally to said one side of the latter and adapted to be engaged by the left foot of the operator of a vehicle whereby when said left foot pedal is depressed said actuating arm will also be depressed to urge the accelerator pedal downwardly, said journalling means also including means slidably receiving said shaft for longitudinal movement of the latter whereby said shaft may be axially displaced in order to cause said abutment means to move out of alignment with said accelerator pedal in order that said actuating arm and left foot pedal may be moved to an out-of-the-way position disposed in overlying engagement with said floorboard, an abutment stop carried by said portion of said support shaft and projecting outwardly from the other side thereof and adapted to be engaged by the sole of a driver's shoe, said abutment stop, when said actuating arm and said left foot pedal are disposed so as to generally parallel said plate, diverging away from said plate at an angle relative thereto large enough to enable said abutment stop to be engaged at its free end by the sole of a driver's shoe and depressed toward said plate a sufficient amount to raise said abutment means carried by said actuating arm away from the medial plane of said plate a distance adapting said abutment means to be disposed over the upper surface of said accelerator pedal upon axial shifting of said support shaft by said shoe sole toward said accelerator pedal.

2. The combination of claim 1 wherein said arm, shaft and left foot pedal are formed of one continuous piece of rod-like material.

3. The combination of claim 1 wherein said arm terminates at its free end portion in a laterally directed stub shaft generally paralleling said support shaft, said abutment means comprising a roller journalled on said stub shaft.

4. The combination of claim 1 wherein said left foot pedal comprises a frame like pedal formed of consecutive laterally directed portions of said other end of said shaft.

5. The combination of claim 4 including a cover plate having a rough upper surface secured over said frame-like pedal.

6. The combination of claim 1 wherein said means journaling said support shaft comprises a pair of inverted U-shaped journals carried by and opening toward said plate, said journals being spaced longitudinally of said shaft and engageable by said abutment stop to define limits of axial shifting of said shaft relative to said plate.

References Cited in the file of this patent

UNITED STATES PATENTS

| | | |
|---|---|---|
| 1,970,160 | Allison et al. | Aug. 14, 1934 |
| 2,890,597 | Allgaier | June 16, 1959 |
| 2,955,485 | Powers | Oct. 11, 1960 |